June 18, 1968    J. P. PIETRZYK    3,389,295
BROADBAND DISCHARGE DEVICES OF THE TRANSMISSION LINE TYPE
Filed Aug. 11, 1964    6 Sheets-Sheet 1

WITNESSES
Theodore F. Wrobel
R. Lewis Gable

INVENTOR
Johannes P. Pietrzyk
BY Charles F. Renz
ATTORNEY

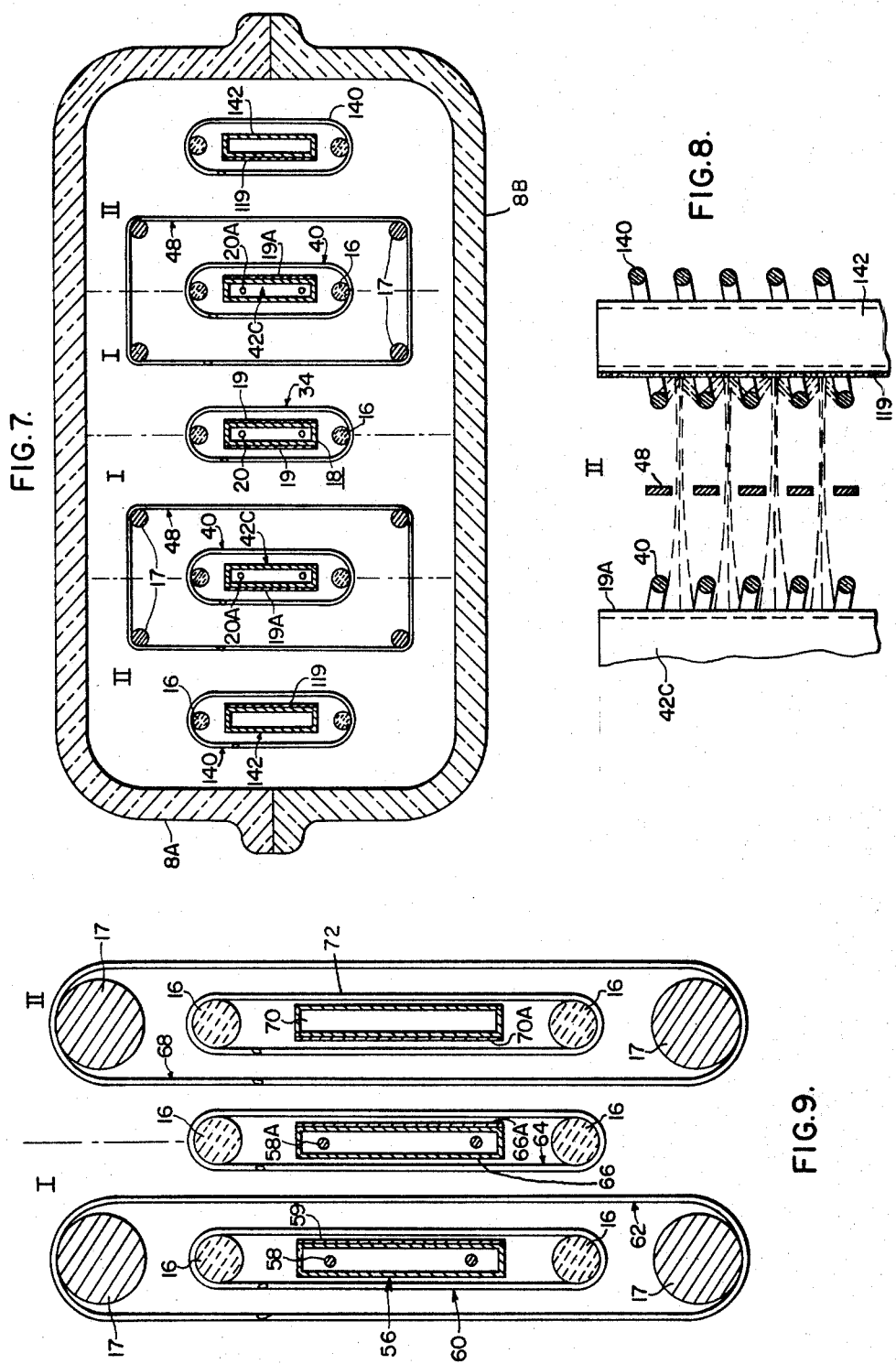

June 18, 1968 J. P. PIETRZYK 3,389,295
BROADBAND DISCHARGE DEVICES OF THE TRANSMISSION LINE TYPE
Filed Aug. 11, 1964 6 Sheets-Sheet 6

United States Patent Office 3,389,295
Patented June 18, 1968

3,389,295
BROADBAND DISCHARGE DEVICES OF THE TRANSMISSION LINE TYPE
Johannes P. Pietrzyk, Elmira, N.Y., assignor to Westinghouse Electric Corporation, East Pittsburgh, Pa., a corporation of Pennsylvania
Filed Aug. 11, 1964, Ser. No. 388,839
12 Claims. (Cl. 315—39.3)

ABSTRACT OF THE DISCLOSURE

This invention relates to a broadband electron discharge device including an input transmission line having a cathode element and a control grid, a continuous output transmission line having a dummy cathode element and a grid whose electrical and mechanical properties are substantially similar to those of the input transmission line. A screen grid is disposed between the input and output transmission lines to substantially isolate spurious signals between the input and output transmission lines. A second output transmission line including a dummy cathode element and a grid may be disposed upon the other side of the input transmission line. In addition, the dummy cathode elements may be coated with a layer of secondary emissive material to emit a beam of secondary electrons onto a second stage of this device including a second dummy cathode and a second grid. Further, a layer of secondary emissive material may be disposed upon the dummy cathode element to receive the electron beam emitted by the cathode element to thereby increase the current adsorbed by the grid of the first output transmission line.

---

This invention relates to electric discharge devices, and more particularly to improved broadband transmission line tubes.

Distributed amplifiers employing a sequence of electron tubes with control grids and anodes connected to lumped constant transmission lines are well known for their broadband characteristics. Attempts have been made to avoid lumped electrode capacitances within the envelope of conventional-type tubes by employing coils in place of the usual grid and anode structures, the coils serving as delay lines. At high frequencies, near the cut-off frequency of the lines, the phase velocity along the lines changes because the inductance and capacitance of the lines are frequency-dependent. To maintain equal phase velocity for the grid and anode lines it is necessary that the change of transmission line parameters with frequency be the same for both lines, but this is not possible in the usual tube structure, in which the anode encloses the grid and the cathode. One proposal for the solution of this problem involves the provision of side-by-side control grid and anode structures having successive line sections connected by lumped impedances. However, because of the discontinuous nature of the grid and the anode, the construction of the tube is rather complex; amplification along the length of the electrode is not continuous and suffers because of the need for space for the lumped reactive elements; reflections occur because of the small imperfections which necessarily exist at discontinuities; and the gain versus frequency curve is not as smooth as desired.

It is a principal object of the present invention to provide transmission line tubes and the like which avoid the foregoing and other disadvantages of the prior art.

More specifically it is an object of the present invention to provide transmission line tubes which employ continuous distributed constant transmission lines for control grid and anode, which are simple in construction, which are free of lumped constant reflections, which have high gain per unit electrode length, which have minimal variation of gain versus frequency, and which have high isolation between input and output circuits.

A further object of the invention is to provide improved transmission line tubes in which the elements of transsimple and efficient arrangements.

Another object of the invention is to provide improved transmission line tubes having plural sections arranged in cascade.

A still further object of the invention is to provide transmission line tubes incorporating secondary emission for enhancement of gain.

Yet another object of the invention is to provide transmission line tubes employing relatively few, simply constructed, and simply supported electrodes.

An additional object of the invention is to provide transmission line tubes in which dummy cathodes or screen grids or anode structures are advantageously employed as secondary emitting electrodes in addition to their usual function.

A still further object of the invention is to provide transmission line tubes in which the elements of transmission line helices are positioned to enhance the beaming of electrons within the tubes, the direction of electrons upon certain elements, and the shielding of certain elements from electrons.

Still another object of the invention is to provide transmission line tubes employing secondary emission in order to increase gain, reduce cathode current requirements and anode and screen grid voltage requirements, reduce cooling problems, permit the use of transmission lines having fine wires in close spacing and improve efficiency.

Briefly stated, but without intent to limit the scope of the invention, a broad aspect of the invention concerns the provision of a transmission line tube in which the control grid and the anode are constructed as continuous transmission line helices or structures having continuously distributed constants from end to end and having substantially identical phase velocity characteristics. In specific forms of the invention the transmission line tubes include distributed screen grids and dummy cathodes and have electrodes arranged in multiple or cascaded sections, and in certain embodiments utilize secondary emission with attendant advantages alluded to above and to be described more fully hereinafter.

The foregoing and other objects, advantages, and features of the invention, and the manner in which the same are accomplished will become more readily apparent upon consideration of the following detailed description of the invention taken with the accompanying drawings, which illustrate preferred and exemplary embodiments, and wherein:

FIG. 7 is a horizontal sectional view illustrating an embodiment of the invention having cascaded sections and utilizing secondary emission;

FIG. 8 is a fragmentary partly sectional view illustrating a detail of one form of the invention;

FIG. 9 is a sectional view illustrating another embodiment of the invention employing cascaded sections and utilizing secondary emission;

Figure 1:
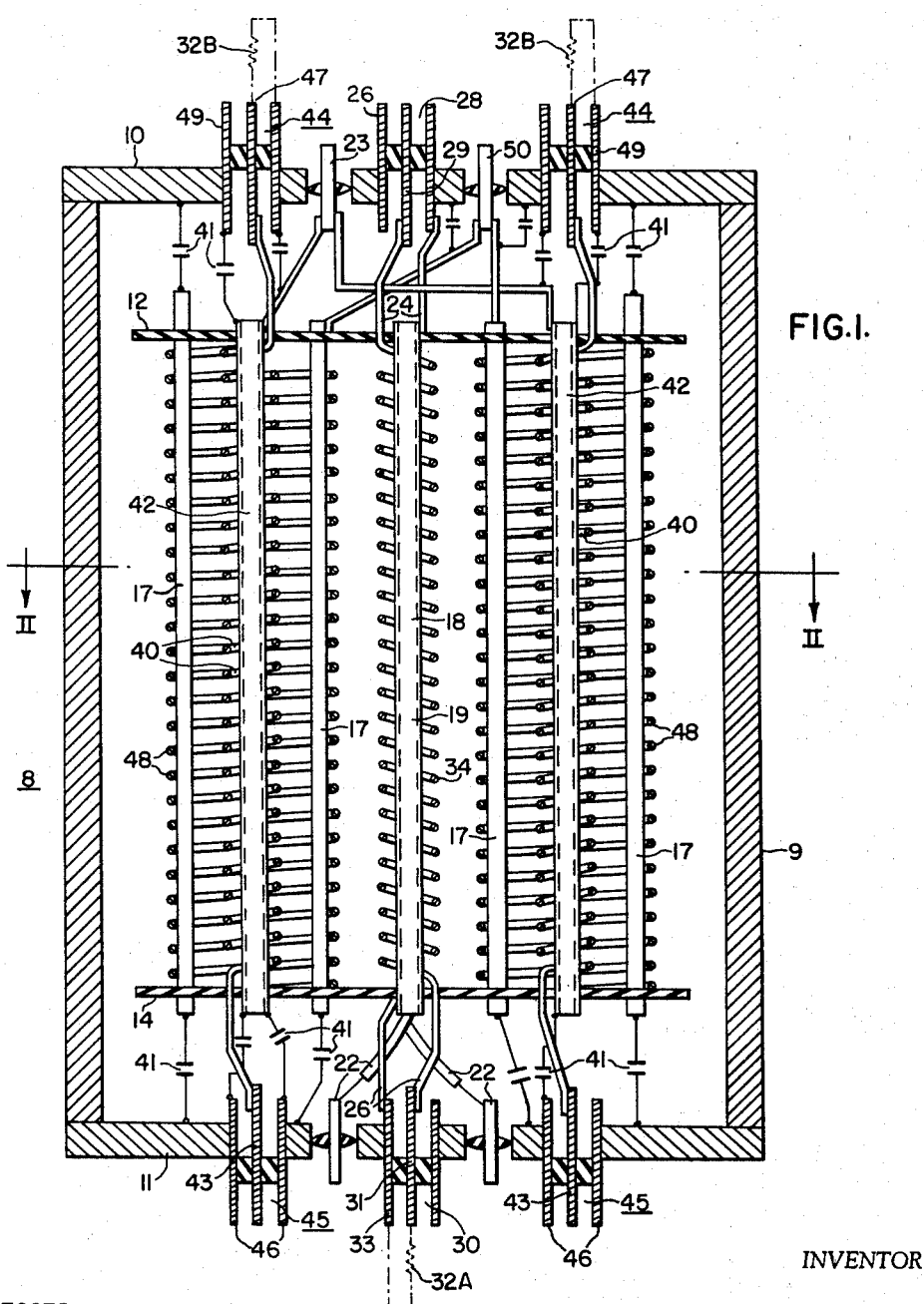
FIGURE 1 is a vertical sectional view illustrating one form of transmission line tube in accordance with the invention.
Figure 2:
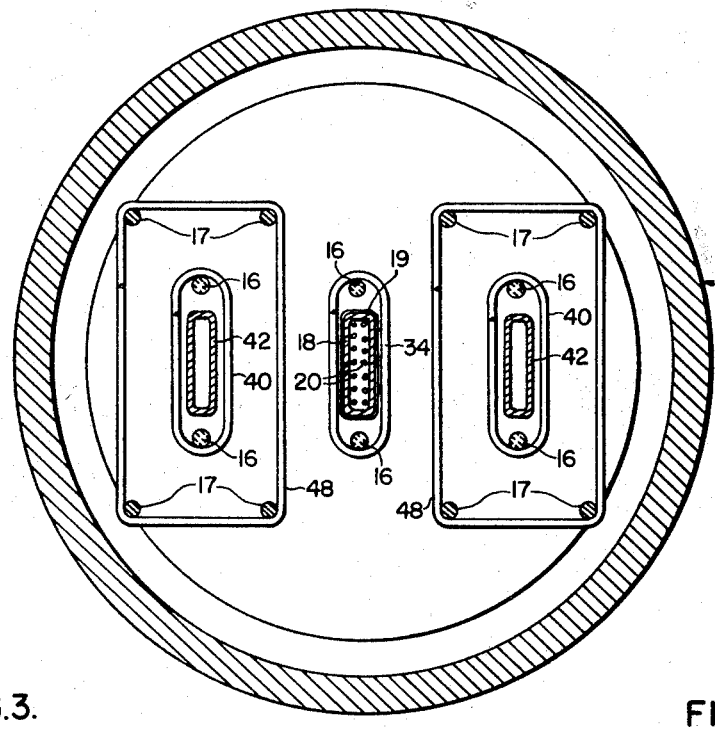
FIG. 2 is a horizontal sectional view taken along line 2—2 of FIG. 1.

Referring to the drawing, and initially to FIGS. 1 and 2 thereof, a transmission line tube constructed in accordance with the principles of the invention may comprise an evacuated envelope 8 comprising an enclosing portion 9 made of a ceramic, glass or metal material, for example, and top and bottom portions 10 and 11 respectively, preferably made of metal. An envelope 8A may be formed in two parts joined at a vertical center plane as shown in FIGURE 7. The envelope 8 contains and supports a pair of spaced insulating discs 12 and 14 which are constructed to support the electrodes of the tube, either directly or by virtue of ceramic posts 16 (see FIG. 2) and metallic posts 17. Located preferably centrally of the tube envelope 8 is a cathode 18, which may be of the thermal-emissive type. The tube illustrated is a two-section type and has electrodes arranged on opposite sides of the cathode 18. As will become apparent hereinafter, the tubes of this invention may have a single section or a plurality of sections. Cathode 18 has a plate-like construction and is constituted of a flat tube of rectangular cross-section having the outer surfaces of its opposite major sides coated with a suitable electron emitting material 19. Inside the cathode sleeve is a heater winding 20 having its ends connected to lead wires 22 which may extend through the bottom portion 11 of the envelope 8 (insulated therefrom if the wall is metal) as shown in FIGURE 1. The lead wires 22 and the others to be described are sealed into the envelope 8 in accordance with conventional techniques. The cathode 18 is supported upon the insulating discs 12 and 14 or in long extended tubes by other means known to those skilled in the art, and is connected at opposite ends to outer conductive terminals 33 and 26 of coaxial lead-ins 28 and 30.

A control grid 34 is supported in closely spaced relation to the cathode 18. The control grid 34 comprises a close-turn wire helix wound continually about the cathode 18 from top to bottom and supported upon ceramic posts 16 (FIG. 2). The control grid 34 constitutes a true transmission line having continuously distributed inductance and capacitance from end to end. One end of the control grid 34 is connected to an inner post 29 of the coaxial lead-ins 28, which may extend through the top portion 10 of the envelope 8. The other end of the control grid 34 is connected to the inner post 31 of the coaxial lead-in 30 which may in turn be connected in terminating impedance 32A. The terminating impedance 32A shown in phantom lines in FIG. 1 comprises a resistor connected between the inner post 31 and the outer post 33 of the coaxial lead-in 30, which is in turn connected to the cathode 18. It may be noted that the cathode 18 can be connected to the coaxial lead-ins 28 and 30 through capacitors. The cathode 18 would then be connected also to another lead-in (not shown) to provide a suitable bias through said lead-in. The connections would appear similar to those of the dummy cathodes described hereinafter.

The tube sections at opposite sides of the cathode 18 comprise anodes 40 spaced from the control grid 34. Each anode 40 is a true distributed constant transmission line with continuously distributed inductance and capacitance from end to end. Each anode 40 is preferably a wire helix having the same configuration and the same pitch (turns per inch) as the control grid 34. In order that the phase velocity characteristic of the anode 40 may be the same as the phase velocity characteristic of the grid transmission line, each anode 40 contains dummy cathodes 42 having substantially the same configuration and dimensions as the cathode 18, but lacking the thermo-emissive material 19. The dummy cathodes 42 are connected through capacitors 41 to the outer posts 46 and 49 of coaxial lead-ins 44 and 45 respectively. For DC connection, one end of the dummy cathodes 42 may be connected to a lead-in 23 insulated from the top portion 10 of the envelope 8. From FIG. 2 it is apparent that the arrangement of each anode 40, its ceramic posts 16, and its dummy cathode 42 is substantially identical to the arrangement of the control grid 34, its ceramic posts 16, and the cathode 18. One end of each anode 40 is connected to the inner post 43 of coaxial lead-ins 45, which pass through the bottom portion 11 of the envelope 8, and the other end of each anode 40 may be connected to the inner post 47 of coaxial lead-ins 44, which pass through the top portion 10 of the envelope 8. Further, the dummy cathodes 42 may be connected through the inner and outer posts 47 and 49 of the coaxial lead-ins 44 to terminating impedances 32b as indicated in phantom lines in FIG. 1.

Figures 3, 3A:
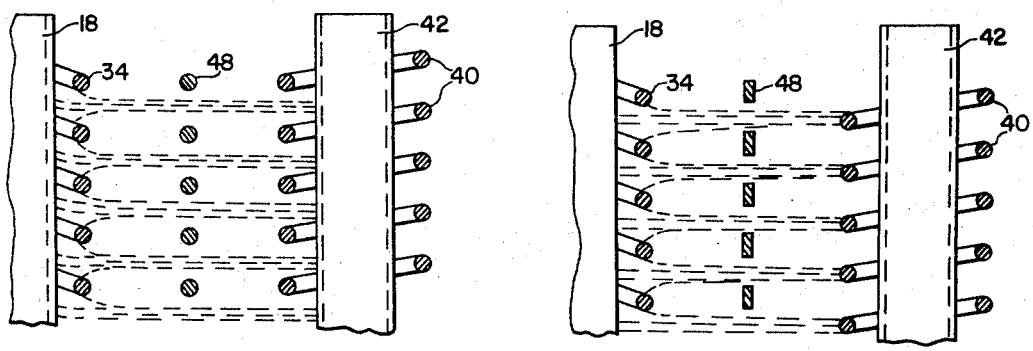
FIG. 3 is a fragmentary partly sectional view illustrating a detail of one form of the invention.
FIG. 3A is a fragmentary partly sectional view of another modification of this invention.

In the form of the invention shown in FIGS. 1 and 2, each section of the tube is provided with a screen grid 48. Each screen grid 48 may be a continuous coil of rectangular cross section supported upon metallic posts 17 and is connected to a lead wire 50, which extends through the top portion 10 of the envelope 8. Both ends of the screen grid 48 should be connected through capacitors 41 with cathode 18 or the metal envelope 8. In the preferred form each screen grid 48 serves the functions of (1) shielding the anode 40 from the control grid 34, and (2) focusing the electrons passing through the control grid 34 onto the dummy cathode 42 of the anode 40. For these purposes the turns of the control grid 34, screen grid 48, and anode 42 of each section of the tube are preferably arranged as in FIG. 3, wherein it is seen that the screen grid 48 has the same pitch as the control grid 34 and the anode 40, and turns of the anode 40 are positioned so as to be aligned with turns of the control grid 34 and the screen grid 48 so that electrons emitted from the cathode 18 are collected efficiently by the dummy cathode 42. The anode 40 might also be positioned as shown in FIG. 3A so that the turns of the anode 40 would be aligned with the spaces between the turns of the control grid 34 and screen grid 48 in order that electrons from the cathode 18 would be collected efficiently by the anode 40.

In operation, an electromagnetic wave is applied through the inner post 29 of the coaxial lead-in 28 to the control grid 34, which as mentioned before is a continuous transmission line. The electromagnetic wave travels down the control grid 34 exciting the successive portions of the grid 34 by the voltage existing between the control grid 34 at that point in the wave and the cathode 18. The screen grid 48 has been interposed between the control grid 34 and the anode 40 to effect a substantial isolation between these elements. Therefore, the flow of electrons established by the material 19 of the cathode 18 forms the only electrical interconnection between the control grid 34 and the anode 40. The input magnetic wave travels down the length of the control grid 34 thus controlling or manipulating the successive electron streams until the wave is absorbed in the terminating impedance 32A.

Due to the regulated flow of electrons established by control grid 34 and the cathode 18 emitted toward the anode 40 and dummy cathode 42, an output wave is generated in the voltage between these last-mentioned elements. Depending on how the turns of the anode 40, control grid 34 and screen grid 48 are aligned, the electrons may be directed either toward the dummy cathode 42 (see FIG. 3) or toward the anode 40 (see FIG. 3A). The output wave so generated in these elements will flow in both directions; that portion of the induced wave travelling toward coaxial lead-ins 44 will be absorbed in terminating impedances 32B. To ensure a maximum output wave, the impedances of the input transmission line established by the cathode 18 and the control grid 34, and the output transmission line established by the anode 40 and the dummy cathode 42 are chosen and determined so that both transmission lines are of like phase velocity; therefore, the input wave travelling along the input wave transmission line has the same phase correlation with the output wave along the entire transmission line structure. This result is accomplished by constructing the anode 40 and the control grid 34 of substantially identical transmission lines to ensure that the distributed impedances along these continuous lines are matched with each other. Further, the dummy cathode 42 is constructed of substantially identical configuration as the cathode 18 and is positioned with respect to the anode 40 as the cathode 18 is located with respect to the control grid 34 to thereby maintain the capacitances between these elements the same.

A tube constructed in the foregoing manner provides a truly distributed amplifier in which the voltage between control grid 34 and cathode 18 affects the flow of electrons to the anode structure 40 along the entire length of the grid transmission line. Since amplification occurs along the entire length of the electrode structure, the structure can be shorter for a given amount of electron current than is possible with a discontinuous structure in which space must be provided for reactive elements. The absence of discontinuities avoids the problem of reflections which occur from small imperfections necessarily inherent in a lumped constant type of structure. Since the elements of the tube are continuous and uniform, the physical construction of the tube is simple in comparison to discontinuous structures. The large electrode areas provided by the continuous rectangular cross section electrode structures promote efficient operation, and the uniformity of construction insures uniform gain versus frequency curves. The gain per unit length of the tube is higher than with discontinuous structures, and the isolation between input and output circuits is higher. Moreover, the electrode structure of the invention is especially adapted to plural section tubes, as is apparent from FIGURES 1 and 2.

Figures 4A, 4B:
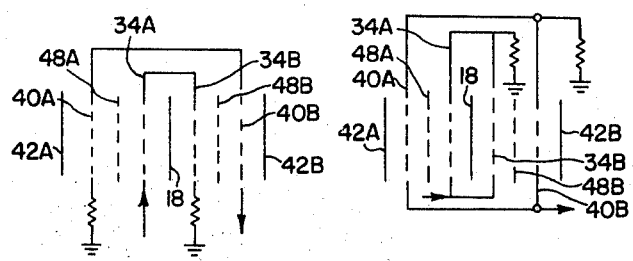
FIGS. 4A and 4B are explanatory diagrams of various forms of this invention.
Figure 4:
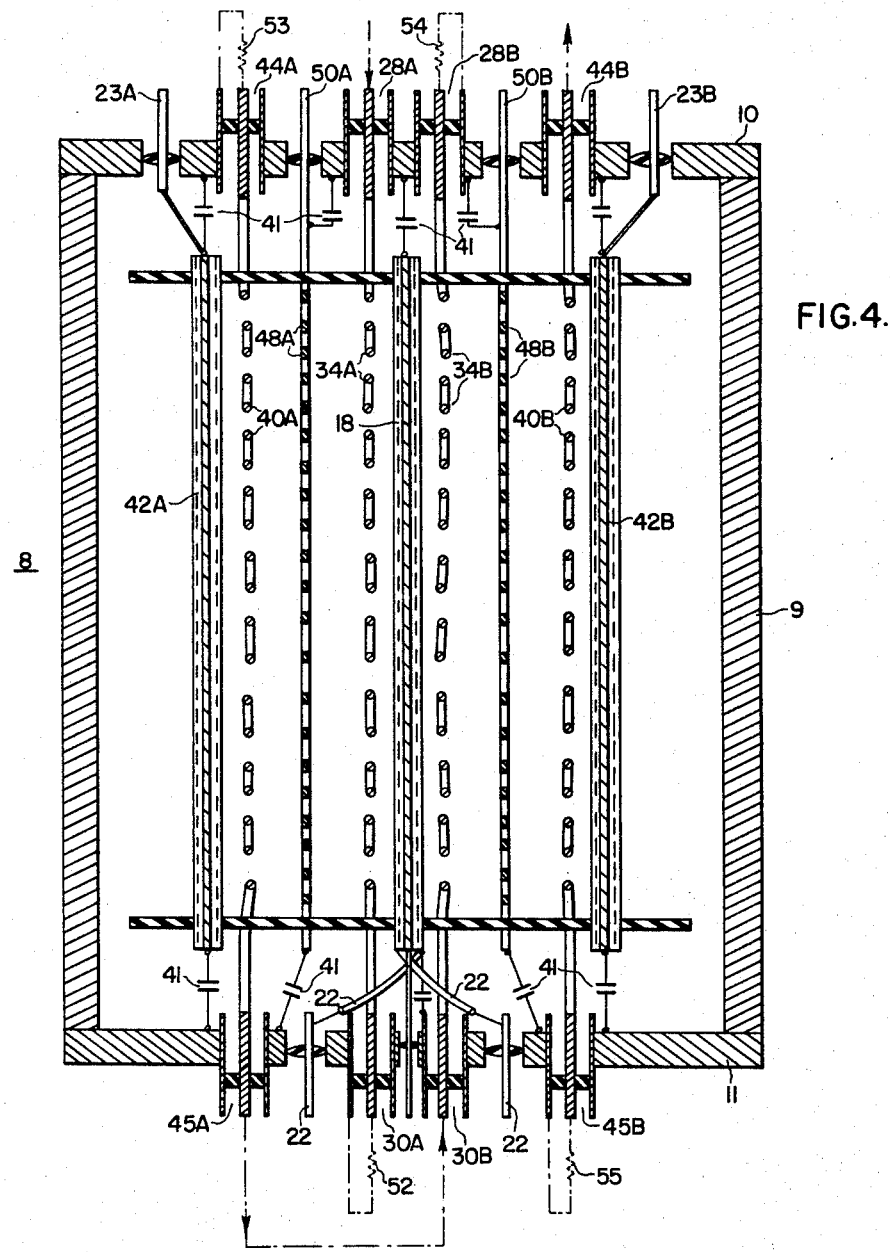
FIG. 4 is a vertical sectional view illustrating another form of transmission line tube in accordance with the invention.
Figure 5:
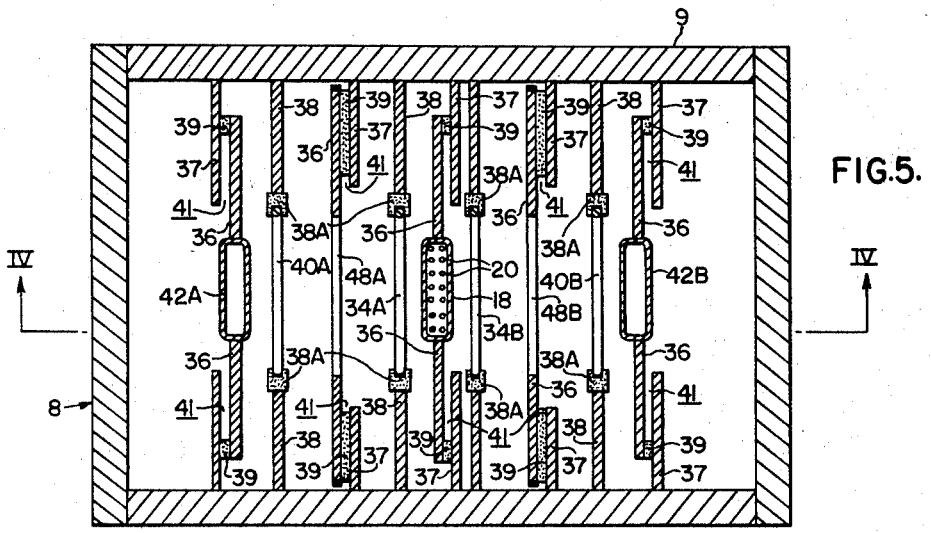
FIG. 5 is a horizontal sectional view of an embodiment similar to FIG. 4.
Figure 6:
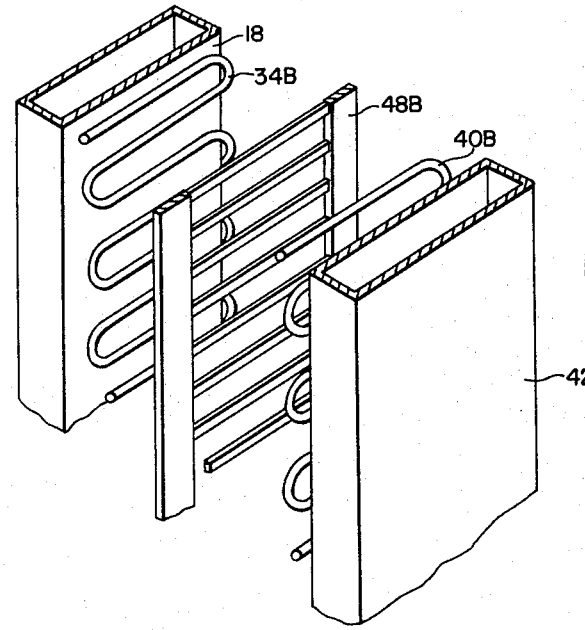
FIG. 6 is a fragmentary perspective view illustrating a detail of one form of the invention.

FIGS. 4, 5 and 6 illustrate another form of discharge tube incorporating this invention. The cathode 18 is centrally supported within the enclosing portion 9 of the envelope 8 and has a heater winding 20 energizing the emission of electrons. The control grid 34 is not wound as a helix around the cathode 18 as shown in FIGS. 1 and 2, but instead forms two sections 34A and 34B which are aligned on either side of the cathode 18. Each of the sections 34A and 34B is bent to form a planar serpentine structure. Further each of the sections 34A and 34B may be connected in series or in parallel manner, if desired, as indicated in FIGS. 4A and 4B, respectively. On opposite sides of the cathode 18, planar anode portions 40A and 40B are spaced from the sections 34A and 34B of the control grid. Each of the anode portions 40A and 40B is a true image of the grid structure and has a dummy cathode 42a or 42B. The dummy cathodes 42A and 42B may be of a secondary emissive type, if desired, as will be described later. Each of the sections 34A and 34B of the control grid is screened by screen grids 48A and 48B which may be punched out of sheet metal. The wires of the control grid 34, the screen grids 48A and 48B, and the portions 40A and 40B of the anode are preferably aligned as shown in FIG. 3, but the wires of the portion 40A and 40B of the anode may also be aligned with the spaces between the wires of the screen grids 48A and 48B in a manner similar to that shown in FIG. 3A. The portions 40A and 40B of the anode may be connected either in series or parallel if desired, according to the connection of the two sections 34A and 34B of the control grid, as indicated in FIGS. 4A and 4B, respectively. It should also be understood that cascaded structures may be used. For example, as shown in phantom lines in FIG. 4, the signal may be fed into a coaxial lead-in 28A at one end of section 34A of the control grid. The other end of section 34A may be connected through the coaxial lead-in 30A to its impedance 52. The corresponding portion 40A of the anode may be connected through coaxial lead-in 45A with the coaxial lead-in 30B, which is in turn connected to the section 34B of the control grid. The other end of the section 34B of the control grid may be connected through coaxial lead-in 28B to its terminating impedance 54. The amplifier signal may be taken from portion 40B of the anode through coaxial lead-in 44B and connected through coaxial lead-in 45B to a terminating impedance 55 of the magnitude of the characteristic impedance of this portion.

The cathodes 18, 42A, and 42B and the screen grids 48A and 48B should be well grounded by means of capacitors 41, which are shown schematically in FIG. 4. As shown in FIG. 5, each capacitor 41 may be constituted by a pair of spaced plates, each pair including a metal side extension 36 from one of the above-mentioned electrodes and a mating plate 37 extending from the enclosing portion 9 of the envelope 8 and spaced from plate 36 by dielectric 39. The right and left halves of the discharge device are isolated by the side extensions 36 secured to the cathode 18, so that the input structure does not influence the right input structure. The sections 34A and 34B of the control grid and the anode portions 40A and 40B may be supported by metal plates 38 extending from the enclosing portion 9 of the envelope 8 and attached to their respective elements by means of dielectric spacers 38A. Other types of slow-wave structures suitable to control the cathode current may be used, so long as the input and output structures are mechanically and, therefore, electrically identical.

FIGURE 7 illustrates the manner in which the basic construction of FIGURE 2 may be expanded to provide additional tube sections connected in cascade with the previously described sections and in addition illustrates the manner in which secondary emission may be incorporated in the tube to provide still higher gain.

Comparing FIGURE 7 with FIGURE 2, it will be observed that the envelope 8A is expanded to accommodate additional electrode structure beyond the screen grids 48. The basic physical construction of the tube follows the principles set forth in connection with FIGURES 1 and 2 and needs no detailed description. A central thermo-emissive cathode 18 having a heater 20 is surrounded by the control grid 34, and as in FIGURE 2, the sides of the cathode 18 are provided with thermo-emissive material 19. The dummy cathodes 42C of the embodiment shown in FIGURE 7 are provided with thermo-emissive material 19A at the side thereof remote from cathode 18, and cathodes 42C contain a heater 20A in the same manner as cathode 18.

The additional electrode structure at the ends of the tube includes secondary dummy cathodes 142 having the cathode configuration previously described, these cathodes being surrounded by secondary anodes 140 having the same construction and the same output and termination connections as described in connection with the anodes of FIGURE 2. In the embodiment of FIGURE 7 the side surface of each cathode 142 facing toward the cathode 18 is provided with secondary electron emissive material 119. As will become apparent, the construction of FIGURE 7 provides cascaded stages I and II at each side of the tube, as well as secondary emission gain enhancement, but the cascaded constructions of the invention may be employed without secondary emission, and secondary emission may be employed in embodiments of the invention without cascaded stages.

In the cascade operation of the tube of FIG. 7, the anodes 40 serve as anodes for tube sections I and also serve as control grids for tube sections II. Since anodes 40 are wound continuously about dummy cathodes 42C, it is apparent that the energy propagated along these transmission lines serves to control the flow of electrons from cathodes 42C to the secondary anodes 140. Screen grids 48 serve both tube sections I and II.

Electrons emitted from the cathode 18 are controlled by the signal upon the control grid 34 and pass through the screen grids 48 to the anodes 40 as described in connection with FIG. 2. The preferred arrangement of the turns of the control grid 34, screen grid 48, and anodes 40 of sections I is as illustrated in FIG. 3A; amplification occurs in the tube sections I as previously described. However, it would be possible to arrange the control grid 34, screen grid 48 and anodes of section I in accordance with FIGURE 3. In such a configuration, the electron flow emitted by the cathode 18 strikes the dummy cathode 42C resulting in an expenditure of thermal energy in the dummy cathode 42C. The thermal energy in turn causes the thermo-emissive material 19A to emit another flow electrons directed toward the secondary dummy cathodes 142. It is noted that if such an arrangement were used, the heater 20A could be omitted. Further, in the embodiment of FIG. 7, the signals on the anode 40 also serve to control the electrons emitted from the dummy cathodes 42C. Electrons emitted from these surfaces pass through the side of screen grids 48 in sections II and impinge upon the electron emissive material 119 of the secondary dummy cathodes 142. As shown in FIG. 8, the turns of secondary anodes 140 are preferably positioned with respect to the turns of the anode 40 and screen grid 48 so that the primary electrons strike the emissive material 119, rather than the turns of the secondary anode 140. Secondary electrons emitted from the material 119 impinge upon and are collected by the secondary anode 140. If the potential of the secondary dummy cathodes 142 is adjusted so that the primary electrons arrive with the proper energy for good yield of secondary electrons, a much larger number of electrons will be collected by the secondary anodes 142 than would be true in the absence of secondary emission. Enhanced gain is thus obtained not only by virtue of the cascading of the sections, but also because of the secondary emission. A current multiplication of only 1.4, obtained from the secondary emission, results in a power gain multiplication of 2, which is quite significant in a broad-band device, because the input capacitance can then be reduced. The primary electron stream may alternatively be focused onto secondary anodes 140 having a secondary emissive material thereon and the secondary dummy cathodes 142 may collect the larger number of secondary electrons. The turns of the secondary anodes 140 should then be aligned with the spaces between the turns of the screen grid 48.

A cascaded amplifier without secondary emission could be provided simply by eliminating the secondary emission material 119. Also, secondary emission may be utilized in the embodiment of FIGURE 2, for example, without cascading, by providing dummy cathodes 42 with a coating secondary emissive material facing cathode 18.

FIGURE 9 illustrates the electrode structure of another embodiment of cascaded distributed amplifier in accordance with the invention. The physical configuration of this embodiment is generally similar to those previously described in that the cathodes are tubes of rectangular cross section, and the control grids and anodes are suitably terminated helical transmission lines, supported upon ceramic rods 16. Metal rods 17 are employed to support the screen grids. The surrounding envelope of the tube is not shown but may take the forms previously described, for example. The tube includes two cascaded sections I' and II'. Cathode 56 includes a heater 58 and has one side coated with a suitable thermal-emissive material 59. Surrounding the cathode 56 is a control grid 60 which receives an input signal at one end and may be terminated in its terminating impedance at the other end. Electrons from cathode 56 pass through a screen grid 62 and are collected by an anode 64, which is preferably identical to control grid 60, at least with respect to its phase velocity characteristic. The turns of the control grid 60, screen grid 62, and anode 64 in section I' are preferably positioned as shown in FIG. 3A. Anode 64 surrounds a secondary cathode 66 having a heater 58A and provided at the side remote from cathode 56 with a thermal emissive material 66A. Anode 64 also serves as a control grid in section II' with respect to the electrons emitted from the material 66A. These electrons pass through a secondary screen grid 68 and impinge upon an electron emissive material 70A disposed upon a dummy cathode 70, which is positioned within a secondary anode 72. Secondary electrons emitted from the material 70A are collected by the secondary anode 72, which preferably is constructed like anode 64, the relationship of the turns of anode 64, secondary screen grid 68, and secondary anode 72 of section II' being the same as the relationship illustrated in FIG. 8. The anode 64 may be connected at both ends to its terminating impedance, or energy may be withdrawn for external use or for addition to the energy derived from the secondary anode 72. In the last-mentioned case, the phase must be favorable or a phase shifter used; also, anodes 64 and 72 must be connected in true series relation corresponding to the direction of energy flow.

In the foregoing embodiments utilizing secondary emission the dummy cathodes employed as dynodes by providing them with suitable secondary emission material. In an embodiment of the invention which will now be described, one or more screen grids are employed as dynodes to provide significant advantages over comparable transmission line tubes which are not constructed in accordance with the invention. In a transmission line tube for broadband low frequency use, for example, with a bandwidth of about 500 to 1000 megacycles and an upper frequency limit of about 1000 megacycles, it is practical to make the characteristic impedance of the electrode transmission lines equal to 50 ohms. This means that high currents must be employed to obtain output powers of the order of a few hundred watts. The transmission line helices must be made of thick wire and the turn spacing cannot be small enough to obtain high $g_m/I_p$ ratios. Under such circumstances it is necessary to have high anode and screen grid voltages, which lowers the efficiency of the tubes. In the embodiment to be described hereinafter a relatively small cathode current is multiplied by providing two or three secondary emitting screen grids. The anode operates as a collecting electrode, which receives all of the now multiplied current. The input power into the anode is the total current but multiplied only by the voltage difference between the anode and the last screen grid.

Figure 10:
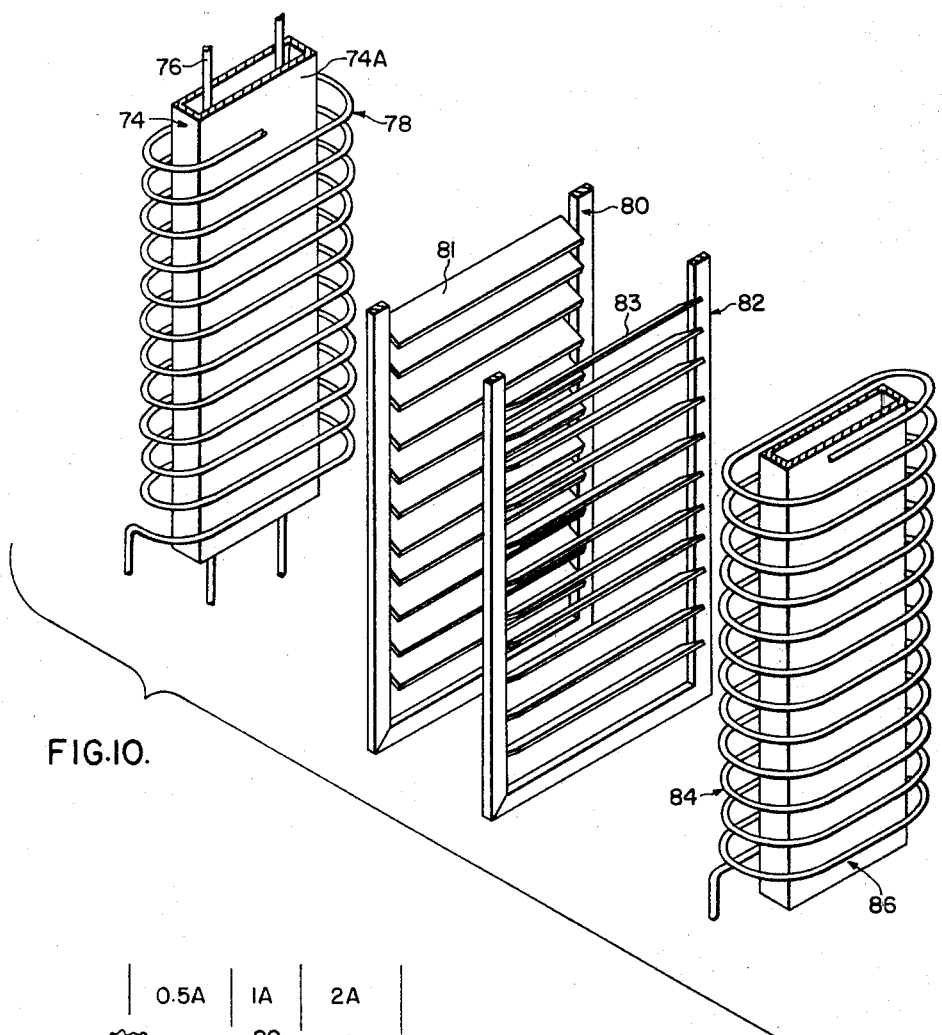
FIG. 10 is an exploded perspective view illustrating diagrammatically an embodiment of the invention employing secondary emitting screen grids.
Figure 11:
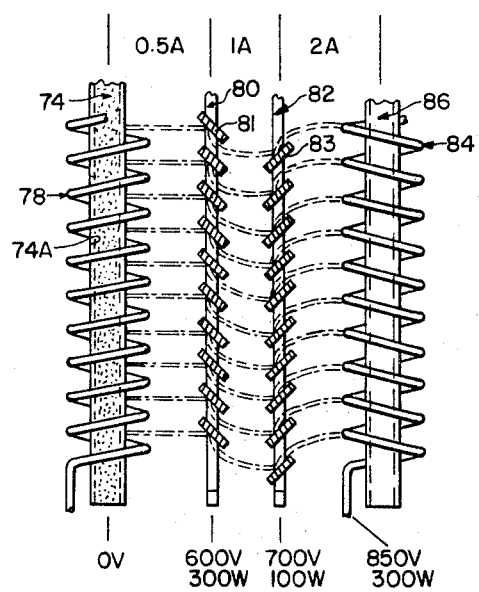
FIG. 11 is a fragmentary vertical sectional view illustrating diagrammatically the operation of the embodiment of FIG. 10.

Referring to FIG. 10, a thermal-emissive cathode 74 for emitting electrons includes a heater 76 and a layer of electron emissive material 74A; the electrons being controlled by a control grid 78 illustrated as a continuous helix surrounding the cathode 74. Again, the input signal is applied to one end of the control grid 78 and the other end is connected to its terminating impedance. The envelope of the tube is not shown in the drawing. The cathode current density now varies along the axis of the cathode in accordance with the signal upon the control grid 78. Electrons from cathode 74 impinge upon a first screen grid 80 having a plurality of bars 81 arranged in a Venetian blind type frame construction. The bars 81 are disposed opposite the space between the turns of the control grid 78, as shown in FIG. 11, in order to receive primary electrons from the cathode 74. The screen grid bars 81 are provided with a suitable secondary emission material and are suitably oriented, as shown, so that when the electrons from the cathode hit the first screen grid 80, the current is multiplied by the secondary emission factor $\delta$ of the screen grid 80. The secondary electrons impinge upon the bars 83 of a second screen grid 82, which may be constructed like the first screen grid 80, but preferably with the bars 83 turned 90° and located with respect to the bars 81 of the first screen grid 80 so as to receive the greatest number of secondary electrons from the first screen grid 80. At the second screen grid 82 there is again a multiplication of current. The secondary electrons from the second screen grid 82 impinge upon an anode 84, which is preferably substantially identical to the control grid 78, having one end connected to its terminating impedance and the other end connected to an output terminal. The turns of the anode 84 are positioned with respect to the bars 83 of the second screen grid 82 so as to collect the secondary electrons efficiently. To ensure that the anode 84 has the same phase velocity characteristic as the control grid 78, a dummy cathode 86 having the same configuration as cathode 74 is preferably positioned within the anode 84. If desired, the anode 84 may be positioned and the chosen so that the current is collected by the dummy cathode 86. Also, as indicated in FIG. 6, the control grid 78 and anode 84 may be flat serpentine structures employed with dynode-like screen grids 80 and 82.

The current impinging upon the anode 84 or dummy cathode 86 is now $i_p = \delta^2 \times i_{cath}$, where $i_p$ is the anode current and $i_{cath}$ the cathode current. The secondary electrons are emitted from second screen grid 82 with very low velocity. At the anode 84 these electrons have only the velocity corresponding to the voltage difference between the screen grid 82 and the anode 84.

FIGURE 11 illsutrates typical operating conditions, showing the respective voltages at cathode 74, first screen grid 80, second screen grid 82, and anode 84, the currents between the successive electrodes and pertinent wattage. From the cathode 74 is drawn a current of 0.5 ampere with a voltage of 600 volts at the first screen grid 80. Assuming a secondary emission factor of 2 for each of the grids 80 and 82, the current received at the second screen grid 82 is 1 ampere at 100 volts, the difference between the voltages at the grids. The current received by the anode 84 is 2 amperes at 150 volts, the difference between the voltage at the anode 84 and the second screen grid 82. Therefore, the wattage at the anode 84 is 300 watts. The R.F. power output should be of the order of 25 watts. Thus, the anode efficiency is:

$$\eta\% = \frac{25 \times 100}{300} \sim 8\%$$

and the total efficiency is:

$$\eta\% \text{ (total)} = \frac{25 \times 100}{300 + 100 + 300} = \frac{25}{7} \sim 3.5\%$$

In the absence of secondary emission, the screen grid voltage (assuming a single screen grid) would have to be more than 2½ times the voltage of the first screen grid of the tube of FIGURE 11, or about 1500 volts. Assuming an anode voltage of 1500 volts also, the anode efficiency would be $$\eta\% = \frac{25 \times 100}{3000} = \frac{25}{30} \sim 0.8\%$$

The cooling problem is much easier to handle at 300 watts, the wattage dissipated by the device of FIGURE 11, than at 3000 watts, the wattage dissipated in the absence of secondary emission. This means that the anode 84, and therefore also the control grid 78 can be made from finer wire and the spacing can be made smaller. Therefore, the $g_m$ of the tube and the gain are greater in a tube constructed in accordance with the invention.

A simple calculation shows that the gain also increases by using secondary emission. If $g_m$ is 50,000 μ mhos at 500 ma., at 2000 ma. $g_m = 50,000 \times 4^{1/3} = 79,000$ μ mhos. If two dynodes are employed as in the tube construction of FIGURE 11, $g_m = 50,000 \times \delta^2 = 50,000 \times 4 = 200,000$ μ mhos, an increase of 2½ times. The increase in the amplification is therefore 8 db.

While preferred embodiments of the invention have been shown and described, it will be apparent to those skilled in the art that changes can be made in these embodiments without departing from the principles and spirit of the invention, the scope of which is defined in the appended claims. For example, under appropriate circumstances frame type screen grids may be employed in place of conventional screen grids, and vice versa, and suppressor grids may also be utilized. Accordingly, the foregoing embodiments are to be considered illustrative, rather than restrictive of the invention, and those modifications which come within the meaning and range of equivalency of the claims are to be included therein.

The invention claimed is:

1. A broad-band electron discharge device comprising an input transmission line having a cathode element for emitting a flow of primary electrons and a control element; an output transmission line having substantially the same electromagnetic propagation characteristics as said input transmission line and including an anode element of substantially the same configuration as said control grid and a dummy cathode element of substantially the same configuration as said cathode element; a screen grid disposed between said input and output transmission lines; said input and output transmission lines being terminated in their characteristic impedances; and means for producing a flow of secondary electrons in response to said flow of primary electrons; said means disposed to intercept said flow of primary electrons and to direct said flow of secondary electrons toward said output transmission line.

2. A broad-band electron discharge device comprising an input transmission line having a cathode element and a control element; an output transmission line having substantially the same electromagnetic propagation characteristics as said input transmission line and including an anode element of substantially the same configuration as said control element and a dummy cathode element of substantially the same configuration as said cathode element; said input and output transmission lines being terminated in their characteristics impedances; a screen grid disposed between said input and output transmission lines; said control grid and said screen grid having portions which are substantially aligned with each other, said anode element having portions disposed between said aligned portions of said control grid and screen grid to receive the electrons emitted by said cathode element.

3. A broad-band electron discharge device comprising an input transmission line having a cathode element with at least two electron emissive surfaces and a control grid having portions disposed to intercept the electrons emitted from said electron emissive surfaces; a first output transmission line having a first anode element of substantially the same configuration as said control grid and a first dummy cathode of substantially the same configuration as said cathode element; a second output transmission line disposed symmetrically about said input transmission line with respect to said first output transmission line and having a second anode element of substantially the same configuration as said control grid and a second dummy cathode of substantially the same configuration as said cathode element; said input transmission line, and said first and second output transmission lines being terminated in their characteristic impedances; a first screen grid disposed between and substantially isolating said input and said first output transmission line; and a second screen grid disposed between and isolating said input transmission line and said second output transmission line.

4. A broad-band electron discharge device as claimed in claim 3, wherein said portions of each of said control grid, said first and second screen grids and said first and second anode elements are of a substantially planar configuration, and are disposed in a substantially parallel relationship with said electron emissive surfaces of said cathode element.

5. A broad-band electron discharge device is claimed in claim 4, wherein there is included means for connecting said anode elements of said first and second output transmission lines in series.

6. A broad-band electron discharge device as claimed in claim 3, wherein said control grid takes the form of a helical winding disposed about said cathode element, and said first and second anode elements take the form of helical windings disposed respectively about said first and second dummy cathode elements.

7. A broad-band electron discharge device is claimed in claim 6, wherein said first and second screen grids take the form of first and second helical windings disposed respectively about said first dummy cathode element and said second dummy cathode element.

8. A broad-band electron discharge device comprising a first transmission line having a first cathode element having a first electron emissive surface for emitting a first stream of electrons, and a control grid; second and third transmission lines each having respectively second and third cathode elements of substantially the same configuration as said first cathode element, and first and second anode elements of the substantially same configuration as said control grid, said second transmission line disposed to receive said first stream of electrons, said second cathode element having an electron emissive surface for directing a second stream of electrons onto said third transmission line; said first, second and third transmission lines being terminated in their characteristic impedances; and first and second screen grids disposed respectively between said first and second transmission lines and between said second and third transmission lines.

9. A broad-band electron discharge device as claimed in claim 8, wherein said first cathode element has a second electron emissive surface for emitting a third stream of electrons; fourth and fifth transmission lines each including respectively fourth and fifth cathode elements of substantially the same configuration as said first cathode element, and third and fourth anode elements of substantially the same configuration as said control grid, said fourth transmission line disposed to receive said third stream of electrons, said fourth cathode element having an electron emissive surface for emitting a fourth stream of electrons onto said fifth transmission line; and third and fourth screen grids disposed respectively between said first transmission line and said fourth transmission line, and between said fourth and fifth transmission lines.

10. A broad-band electron discharge device as claimed in claim 8, wherein said first anode element of said second transmission line includes a plurality of portions disposed transverse to said second stream of electrons, said portions of said first anode element being aligned with portions of said second screen grid and the portions of said second anode element to thereby allow said second stream of electrons to be directed onto said third cathode element, said third cathode element having a secondary electron emissive surface disposed to receive said second stream of electrons.

11. A broad-band electron discharge device as claimed in claim 1, wherein there is provided means for applying energizing potentials to said means for producing a flow of secondary electrons and said anode element positive with respect to said cathode element, the potential difference between said means for producing a flow of secondary electrons and said cathode element being substantially greater than the potential difference between said means for producing a flow of secondary electrons and said anode element.

12. A transmission line tube comprising an input transmission line having a cathode and a control grid with active portions disposed along said cathode; a screen grid having a plurality of screen grid elements spaced from and aligned with successive active portions of said control grid; and an output transmission line having the same electromagnetic propagation characteristics as said input transmission line and having a dummy cathode spaced from said screen grid and having secondary emissive material positioned to receive electrons from said cathode, and an anode element having successive active portions positioned along said dummy cathode and substantially aligned with said active portions of said control grid.

References Cited

UNITED STATES PATENTS

| | | | |
|---|---|---|---|
| 2,647,175 | 7/1953 | Sheer | 315—393 X |
| 2,787,734 | 4/1957 | Nordsieck | 315—39.3 |
| 3,022,443 | 2/1962 | Fowler | 315—39.3 |
| 3,191,086 | 6/1965 | Gebel | 313—65 |

OTHER REFERENCES

"Elongated High Frequency Amplifier Tubes," by Thomas—IBM Technical Disclosure Bulletin, vol. 1, No. 2, August 1958, p. 4.

ELI LIEBERMAN, *Primary Examiner.*

S. CHATMON, JR., *Assistant Examiner.*